US010387849B2

(12) United States Patent
Gordon et al.

(10) Patent No.: US 10,387,849 B2
(45) Date of Patent: Aug. 20, 2019

(54) SYSTEM, METHOD, AND RECORDING MEDIUM FOR A BI-DIRECTIONAL FEED BETWEEN ELECTRONIC CALENDAR AND CREDIT-CARD AUTHORIZATION UNIT

(71) Applicant: International Business Machines Corporation, Armonk, NY (US)

(72) Inventors: Michael S. Gordon, Yorktown Heights, NY (US); James Robert Kozloski, New Fairfield, CT (US); Ashish Kundu, New York, NY (US); Peter Kenneth Malkin, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 692 days.

(21) Appl. No.: 14/944,935

(22) Filed: Nov. 18, 2015

(65) Prior Publication Data

US 2017/0140341 A1   May 18, 2017

(51) Int. Cl.
*G06Q 10/10* (2012.01)
*G06Q 20/40* (2012.01)
*G06Q 20/24* (2012.01)

(52) U.S. Cl.
CPC ......... *G06Q 10/1097* (2013.01); *G06Q 20/24* (2013.01); *G06Q 20/409* (2013.01); *G06Q 20/4016* (2013.01)

(58) Field of Classification Search
CPC .... G06Q 20/4016; G06Q 20/40; G06Q 20/24; G06Q 10/1097; G06Q 20/405; G06Q 20/401; G06Q 20/105; G06Q 20/208; G06Q 20/20; G06Q 20/202; G06Q 20/34;
(Continued)

(56) References Cited

U.S. PATENT DOCUMENTS 8,626,663 B2 * 1/2014 Nightengale .......... G06Q 20/20
705/35
8,798,596 B2 * 8/2014 Shuster ................. H04W 4/023
455/414.1
(Continued)

FOREIGN PATENT DOCUMENTS

GB        2522532    *  3/2014  ............. G06Q 10/10
WO    WO 2014/182785 * 11/2014  ............. G06Q 20/40

OTHER PUBLICATIONS

Rvenscraft, Eric: The Coolest Things You Can Automatically Add to Google Calendar, Nov. 11, 2014, lifehacker, pp. 1-7. (Year: 2014).*

(Continued)

*Primary Examiner* — Bijendra K Shrestha
(74) *Attorney, Agent, or Firm* — Rahan Uddin, Esq.; McGinn IP Law Group, PLLC

(57) ABSTRACT

A method, system, and non-transitory compute readable medium for a fraud detection including a calendar reading device configured to read calendar data of a calendar for a user, a purchase detection device configured to detect an attempted purchase using a credit-card of the user, and a risk detection device configured to detect fraud by calculating a risk based on the calendar data and data related to the attempted purchase.

20 Claims, 5 Drawing Sheets

(58) Field of Classification Search
CPC ............... G06Q 20/387; G06Q 20/409; G06F 3/04842; G06F 3/0481
See application file for complete search history.

(56) References Cited

U.S. PATENT DOCUMENTS

| | | | | |
|---|---|---|---|---|
| 9,032,498 | B1* | 5/2015 | Ben Ayed | G06F 21/35 726/9 |
| 9,858,575 | B2* | 1/2018 | Meredith | G06Q 20/4016 |
| 2002/0032609 | A1* | 3/2002 | Wilkman | G06Q 30/02 705/14.1 |
| 2008/0319808 | A1 | 12/2008 | Wofford et al. | |
| 2009/0012898 | A1* | 1/2009 | Sharma | G06Q 20/24 705/44 |
| 2011/0239146 | A1* | 9/2011 | Dutta | G06Q 10/109 715/768 |
| 2013/0185205 | A1 | 7/2013 | Boss et al. | |
| 2014/0058766 | A1* | 2/2014 | Yu | G06Q 10/109 705/5 |
| 2015/0081349 | A1* | 3/2015 | Johndrow | G06Q 20/3224 705/5 |
| 2015/0142595 | A1* | 5/2015 | Acuna-Rohter | G06Q 20/40 705/21 |
| 2016/0253702 | A1* | 9/2016 | Gonzales, Jr. | G06Q 30/0249 705/14.48 |
| 2016/0294556 | A1* | 10/2016 | Vortriede | H04L 9/321 |
| 2016/0358127 | A1* | 12/2016 | Daboo | G06Q 10/1095 |

OTHER PUBLICATIONS

Palmer, K: How Credit Card Companies Spot Fraud Before You Do, Jul. 10, 2013, US News, pp. 1-4. (Year: 2013).*
Ravenscraft, E.: The Coolest Things You Can Automatically Add to Google Calendar, Apr. 11, 2014, Lifehacker, pp. 1-7. (Year: 2014).*

* cited by examiner

SYSTEM, METHOD, AND RECORDING MEDIUM FOR A BI-DIRECTIONAL FEED BETWEEN ELECTRONIC CALENDAR AND CREDIT-CARD AUTHORIZATION UNIT

BACKGROUND

The present invention relates generally to a bi-directional feed between a calendar and a credit-card authorization unit, and more particularly, but not by way of limitation, to a risk assessment to reduce fraudulent credit-card purchases based on a user's calendar events.

Conventional techniques for credit card transaction servers, systems, methods and computer program products receive information concerning a prospective credit card transaction with one of multiple credit card issuers and obtain location information from multiple wireless network providers for wireless terminal(s) that are associated with a user of the credit card for the prospective credit card transaction. The locations of the credit card transaction terminal(s) and the locations of the wireless terminal(s) are correlated, and authorization information for the prospective credit card transaction is generated based upon this location correlation.

Other conventional techniques for reducing fraudulent usage of credit cards/debit cards consider allowing a user owning the credit cards/debit cards to register the credit cards/debit cards to a GPS (Global Positioning System) enabled device, the GPS enabled device connected to a network; allowing the user to define a range at which the credit cards/debit cards are out of range with respect to the GPS enabled device; authorizing use of the credit cards/debit cards owned by the user after it is determined that the credit cards/debit cards and the GPS enabled device are within the user defined range; and denying the authorization of the credit cards/debit cards owned by the user after it is determined that the credit cards/debit cards and the GPS enabled device are outside the user defined range.

Thus, the present inventors have recognized that there is a technical problem in the conventional information disclosing techniques that the techniques do not consider the user's calendar events. More specifically, each conventional technique to reduce credit card fraud merely considers a user's location or requires the user to contact the credit card company to plan travel.

SUMMARY

In an exemplary embodiment, the present invention can provide a fraud detection system including a calendar reading device configured to read calendar data of a calendar for a user, a purchase detection device configured to detect an attempted purchase using a credit-card of the user, and a risk detection device configured to detect fraud by calculating a risk based on the calendar data and data related to the attempted purchase.

Further, in another exemplary embodiment, the present invention can provide a non-transitory computer-readable recording medium recording a program for fraud detection, the program causing a computer to perform: reading calendar data of a calendar for a user, detecting an attempted purchase using a credit-card of the user, and detecting fraud by calculating a risk based on the calendar data and the attempted purchase.

Even further, in another exemplary embodiment, the present invention can provide a fraud detection method including reading calendar data of a calendar for a user, detecting an attempted purchase using a credit-card of the user, and detecting fraud by calculating a risk based on the calendar data and the attempted purchase.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
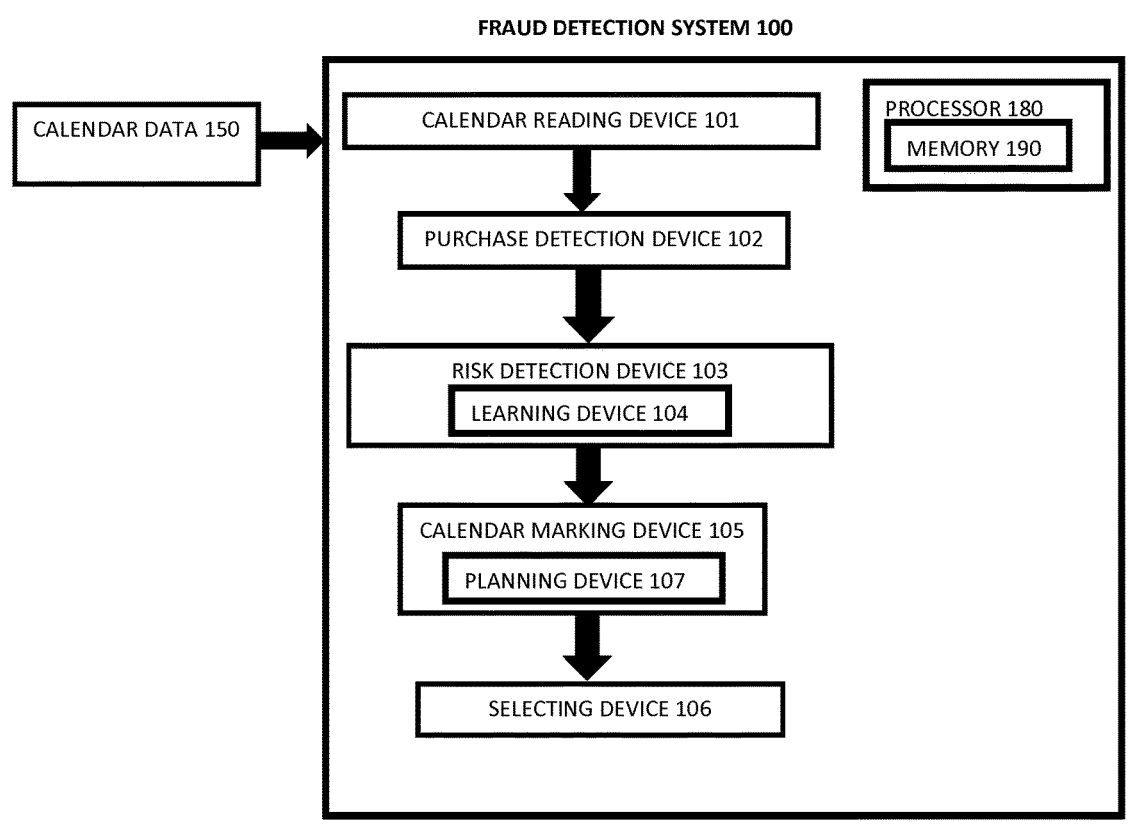
FIG. 1 exemplarily shows a block diagram illustrating a configuration of a fraud detection system 100.

The invention will now be described with reference to FIGS. 1-5, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the fraud detection system 100 includes a calendar reading device 101, a purchase detection device 102, a risk detection device 103, a calendar marking device 104, and a selecting device 105. The fraud detection system 100 receives calendar data 150 as an input based on a user's calendar linked with the fraud detection system 100. The fraud detection system 100 includes a processor 180 and a memory 190, with the memory 190 storing instructions to cause the processor 180 to execute each device of the drone-swarm system 100.

Figure 3:
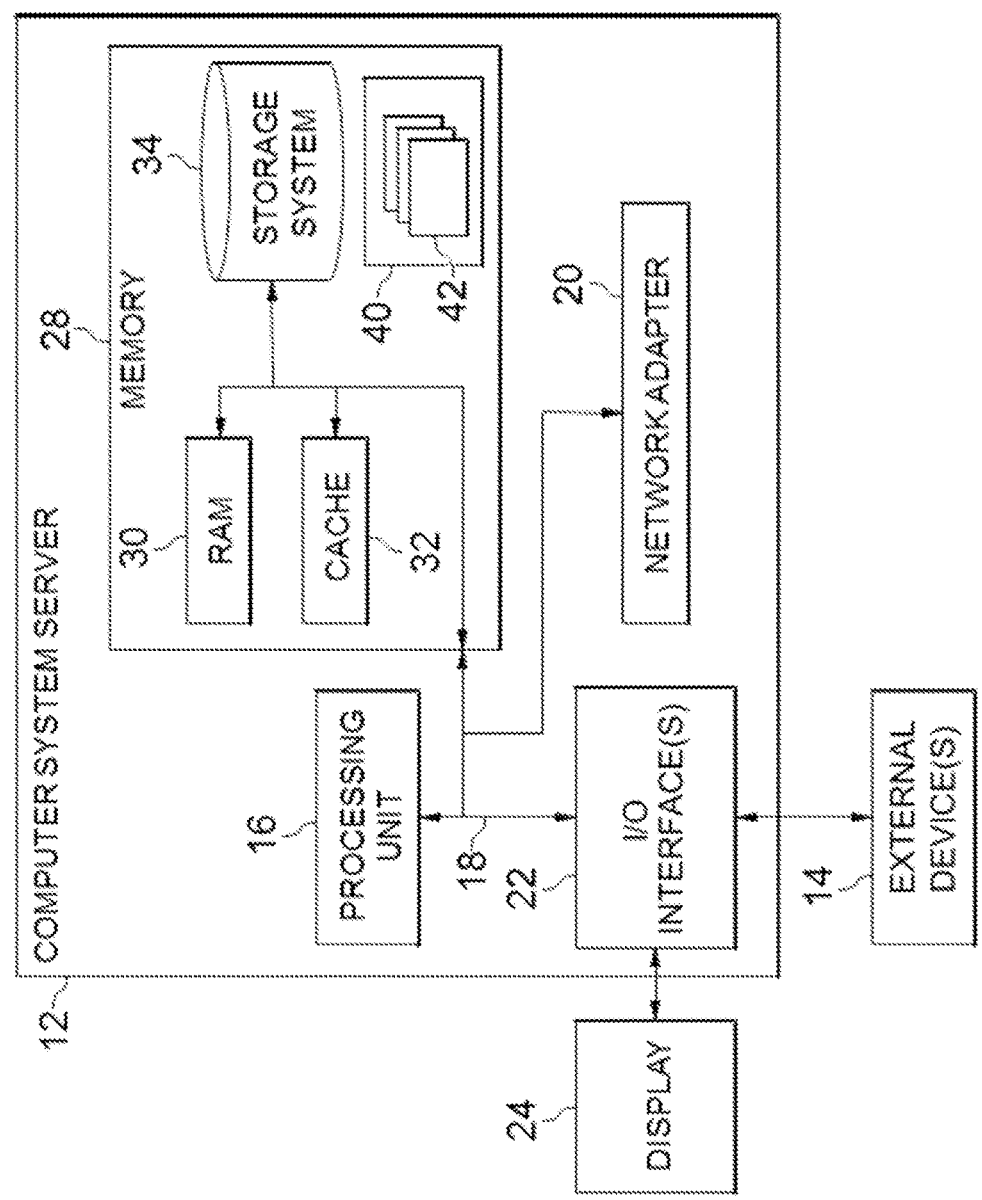
FIG. 3 depicts a cloud computing node according to an embodiment of the present invention.
Figure 4:
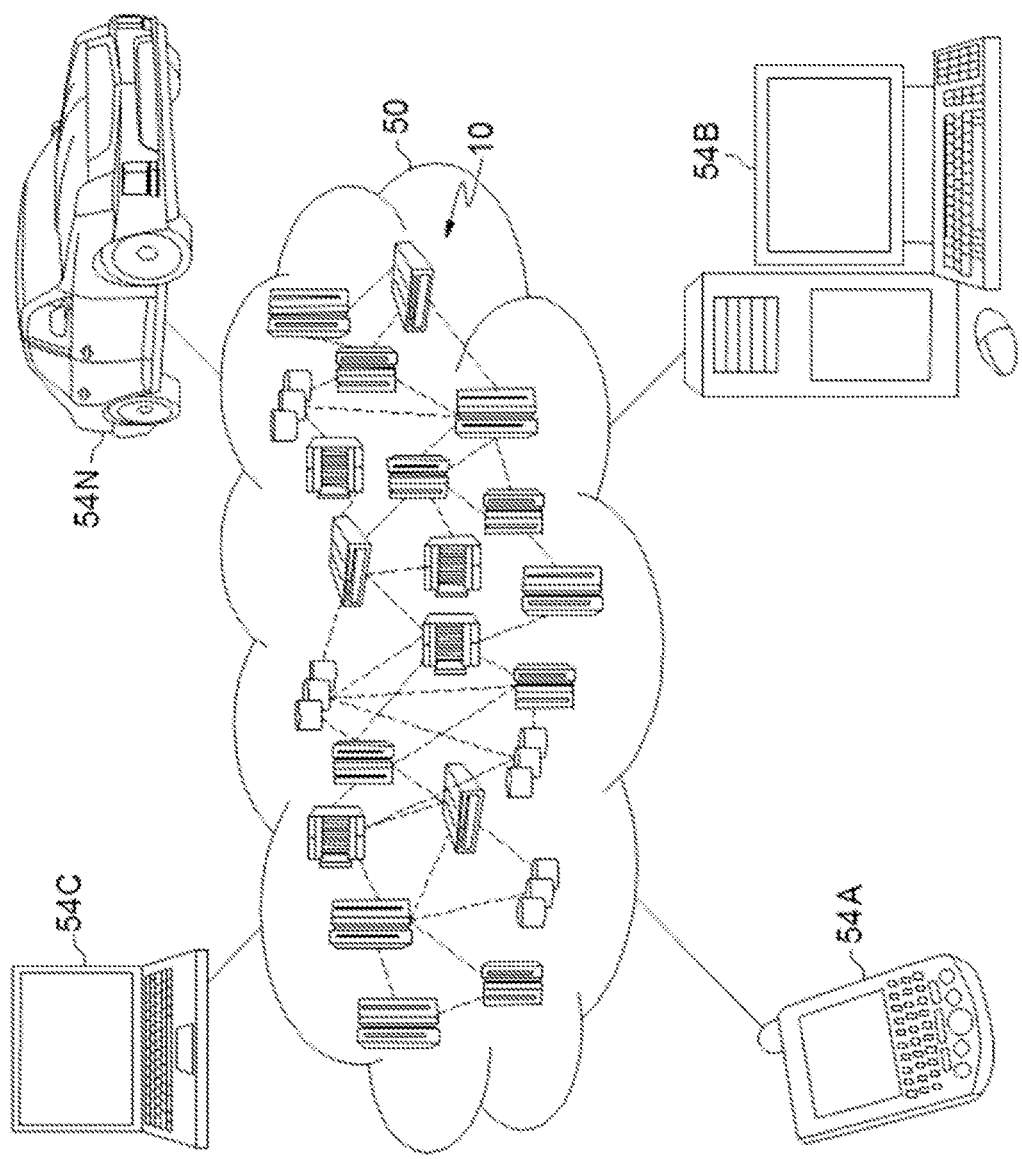
FIG. 4 depicts a cloud computing environment according to another embodiment of the present invention.
Figure 5:
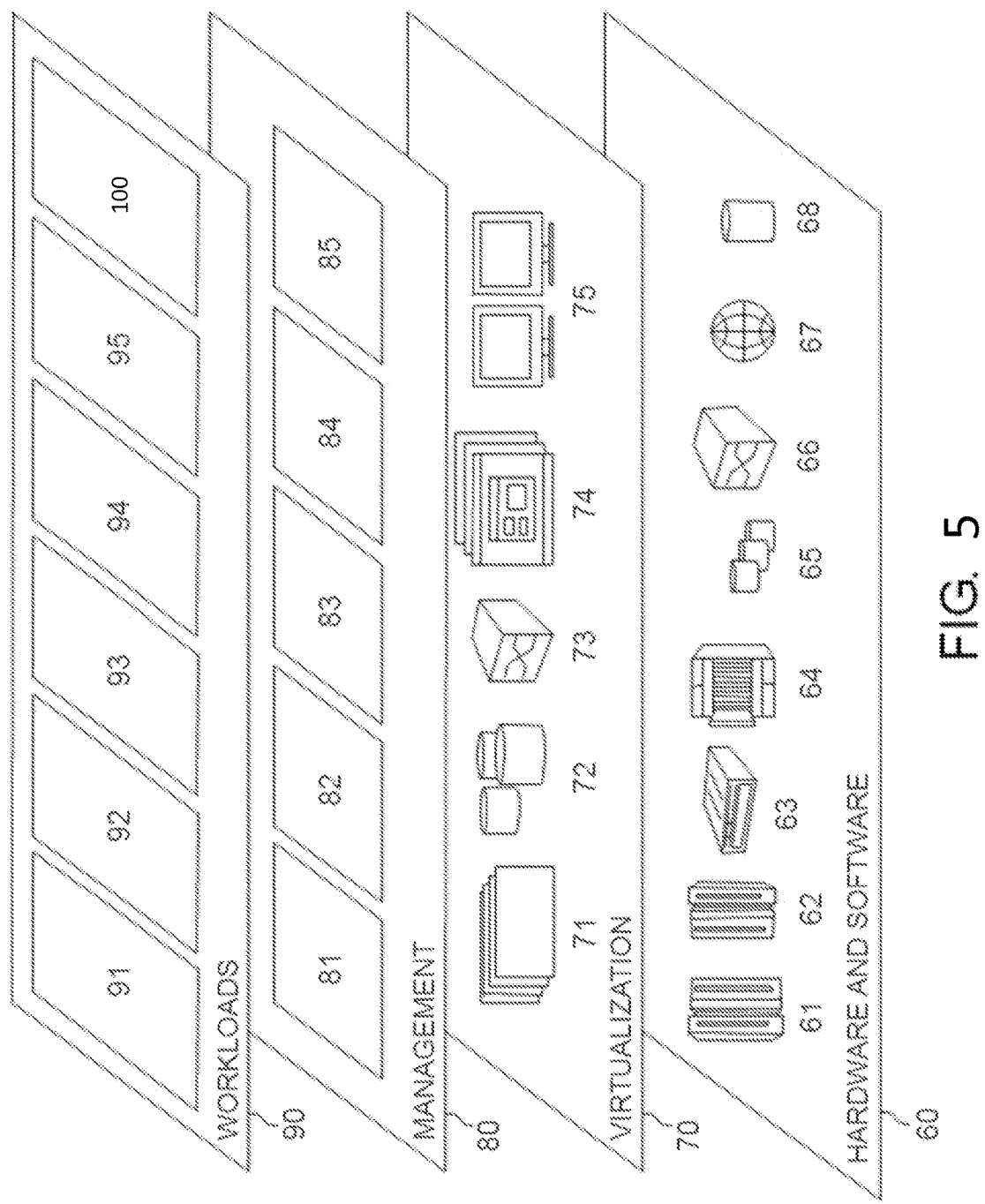
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the fraud detection systems 100 (FIG. 5), it is noted that the present invention can be implemented outside of the cloud environment.

The calendar reading device 101 reads the calendar data 150 to determine the user's activities based on the events the user input into their calendar. An example of an event can include travel plans, appointments, work schedule, etc.

The purchase detection device 102 detects attempted purchases by the user's credit-cards (or any other type of electronic purchase, including but not limited to, Pay-Pal®, debit-card, Apple Pay®, or any other type of electronic payment.

The purchase detection device 102 detects information on the product or service purchased, class of product or service purchased, location of purchase, date, etc.

The risk detection device 103 detects the risk of a fraudulent purchase based on the information detected by the purchase detection device 102 and user's calendar data 150 read by the calendar reading device 101.

That is, the risk detection device 103 uses detected attempted purchase information concerning a prospective transaction with one of multiple credit card issuers and the obtained location information from multiple wireless network providers for wireless terminal(s) that are associated with a user of the credit card for the prospective credit card transaction. The locations of the credit card transaction terminal(s) and the locations of the wireless terminal(s) are correlated, and authorization information for the prospective credit card transaction is generated based upon this location correlation and a correlation with the read calendar data 150.

It should be noted that the term "location" used in the risk detection device 103 can be used to determine stores within a radius R of the location of the events in the calendar data 150, which can be used to decrease or increase the risk of rejection of an attempted purchase.

For example, if the calendar data 150 read by the calendar reading device 101 states that the user is in a meeting between 1 PM and 3 PM, it is highly likely that a attempted purchase at a store even within a small radius R will be fraudulent since the user is supposedly in a different fixed location.

On the other hand, if the user's calendar data 150 indicates that the user is on a vacation in Cape Cod, it would be less likely to label a attempted purchase made in a radius around the user's hotel to be fraudulent by the risk detection device 103.

Even further, if the user's calendar data 150 indicates that the user is on a vacation in Cape Cod, the risk detection device 103 will determine that it is extremely likely that a attempted purchase made in California is fraudulent. Or, if the user's calendar data 150 indicates that the user is on vacation, the risk detection device 103 can determine that is extremely unlikely that the user is shopping on the internet and that all internet attempted purchase can be fraudulent.

In other words, the risk detection device 103 compares the attempted purchase information of the purchase detection device 102 and the calendar data 150 read by the calendar reading device 101 as a bi-directional feed to determine a risk value associated with each attempted purchase.

The user can set a threshold value such that if the risk level is below the threshold value, the risk detection device 103 does not reject the attempted purchase as fraudulent.

Further, the user can input initial conditions into the risk detection device 103 such that the risk detection device 103 customizes the risk according to the user. For example, the user can input a list of items that the user frequently purchases, a list items that the user does not purchase, places that the user frequently makes purchase at, etc. In this manner, the user can update the threshold of the risk detection device 103 to more accurately determine fraudulent purchases as customized to the specific user.

Also, the risk detection device 103 can automatically mark attempted purchases as fraudulent when a certain group of individuals are not present (e.g. husband and wife), or a group of devices are not present together at the location of the attempted purchase and at the time of the attempted purchase. The risk detection device 103 can be configured to register the individuals and their devices that may be together, as well as a set of constraints such as each time a credit card charge of more than $500 is made, and the group of individuals/devices is not together at the time of the attempted purchase, notify calendar of all or some of the designated individuals/devices in the group and annotate it. That is, the risk detection device 103 can be programmed by the user to automatically mark the attempted purchase over, for example, $500 as fraudulent if a second person is not present at the time of making the attempted purchase.

In this manner, if an amount of the attempted purchase is greater than a threshold purchase amount is set by the users, the risk detection device 103 calculates the risk based on a distance of a first user to a second user such that if the distance is greater than a predetermined value, the risk detection device 103 labels the attempted purchase as fraudulent.

The risk detection device 103 can also calculate risk based on the purchasing likelihood for an individual meta-data extracted from a calendar. For example, an individual purchasing a surfboard may seem unusual if the individual is a doctor who has a specific set of tasks scheduled on the calendar for the day, such as surgeries. The person may be deemed more likely to have made an authentic purchase of the surfboard if she has a trip to Hawaii scheduled on her calendar. If the trip is marked as a Pharmaceutical Industry sponsored event in Honolulu, however, the likelihood of the attempted purchase is less than if the calendar entry instead shows Vacation, and even Surfing Lessons in one of its entries for that week.

The risk detection device 103 further includes a learning device 104. The learning device 104 learns the user's tendencies based on the calendar data 150 and past purchase information detected by the purchase detection device 102 and modify the risk detected by the risk detection device 103.

For example, if the user calendar data 150 shows the user being home at a particular time every day (i.e., 8 PM) and the purchase detection device 102 has detected a limited number of purchases after 8 PM in the past, the learning device 104 will teach the risk detection device 104 to associate a higher risk with any purchase made after 8 PM.

Also, if the purchase detection device 102 has detected that the user purchases coffee every morning prior to work (i.e., work is an event on the user's calendar beginning at 8 AM) from a particular coffee shop, the learning device 104 will teach the risk detection device 104 to associate a higher risk with a purchase made at a different coffee shop or after 8 AM.

The learning device 104 analyzes all of the user's past purchase information in correlation to their calendar data 150 and teaches the risk detection device 103 to associate a higher risk or a lower risk with each of the attempted purchase.

Thus, the fraud detection system 100 continuously learns the user's traits and updates the risk detection device 103 so as to customize the fraud detection system for each user and their calendar data 150.

The calendar marking device 105 marks the calendar with data about the attempted purchase. The mark on the calendar can be in the form of a graphical representation or a textual representation in which the user can set as a preference. The calendar mark may be a graphical representation of the product or service purchased, or class of product or service. The calendar mark may appear in the particular day and time on the calendar that an attempted purchase is attempted and/or completed. If desired, precise information may appear near the graphic, along with the type of credit card used. For example, if a credit-card is used to buy a diamond ring, the cost, the location of the attempted purchase may be shown along with the graphical representation of the ring.

That is, the calendar annotation may be a graphical representation of the product or service purchased, or class of product or service. This annotation may appear in the particular day and time on the calendar that a purchase is attempted and/or completed. Optionally, a link may be provided from the card owner (e.g. on the calendar display) to the bank to invalidate the transaction, or raise a concern about the transaction, if the annotation indicating a transaction wasn't initiated by the card owner.

The graphical representation marked on the calendar by the calendar marking device 103 can appear on the electronic calendar as a semi-transparent graphical representation when the purchase is attempted and then, when the attempted purchase is approved, a solid image. In this manner, the user can track when an attempted purchase is pending based on the graphical representation ornamental indication. The appearance is not limited to semi-transparent and solid, but can include a first colored depiction surrounding the graphical representation for pending and a second colored depiction surrounding the graphical representation for approved, a first shape for pending and a second shape for approved, etc. In other words, the calendar marking device 105 can mark the calendar with a first type of mark when the attempted purchase is detected and a second type of mark when the attempted purchase is completed or authorized.

Further, based on the risk detected by the risk detection device 104, the calendar marking device 105 can mark the attempted purchase with a label signifying that the attempted purchase is likely fraudulent.

The selecting device 106 allows the user to select a purchase that the marking device 105 marks in the calendar.

After the risk detection device 104 detects a risk associated with a purchase based on the calendar data, if the risk detection device 104 determines that the attempted purchase is fraudulent, the user can select the attempted purchase on the calendar and confirm or deny the attempted purchase.

Also, the selecting device 106 allows the user to select purchases on the calendar that were not determined to be fraudulent by the risk detection device 103 and report the purchase as fraudulent. The learning device 104 updates the risk detection device 103 to change a threshold limit on a similar purchase that the user signified is fraudulent by using the selecting device 106.

In a second embodiment, authorization may be affected by those with the user or near the user at the point of purchase. This can include a wearable-based authorization and contextual authorization (i.e., if the user is with other individuals carrying their devices (e.g. wife or husband)), and the user has their own wearable-based authorization, a joint consideration of these near people increase the accuracy determining risk of an authorization. The wearable-based authorization can be only worn for a pre-determined period of time such that the learning device 104 can update the system based on user purchases.

In a third embodiment, the calendar marking device 105 can include a planning device 107 to provide insight into the rate of fraudulent transactions, amount spent on shopping, how expenditure per day/week is doing, etc. based on the calendar information. Exploitation of these icons using the planning device 107 can be used for budget planning applications and devices which could provide bar graph views of purchases over daily, weekly, monthly, and yearly time scales. This can help an individual to know that the number and frequency of purchases of a particular item (for example, cappuccino) has increased, and is correlated to a change in cash on hand. We further disclose the modulation of the size of the icon depending on the purchase price of the item.

Figure 2:
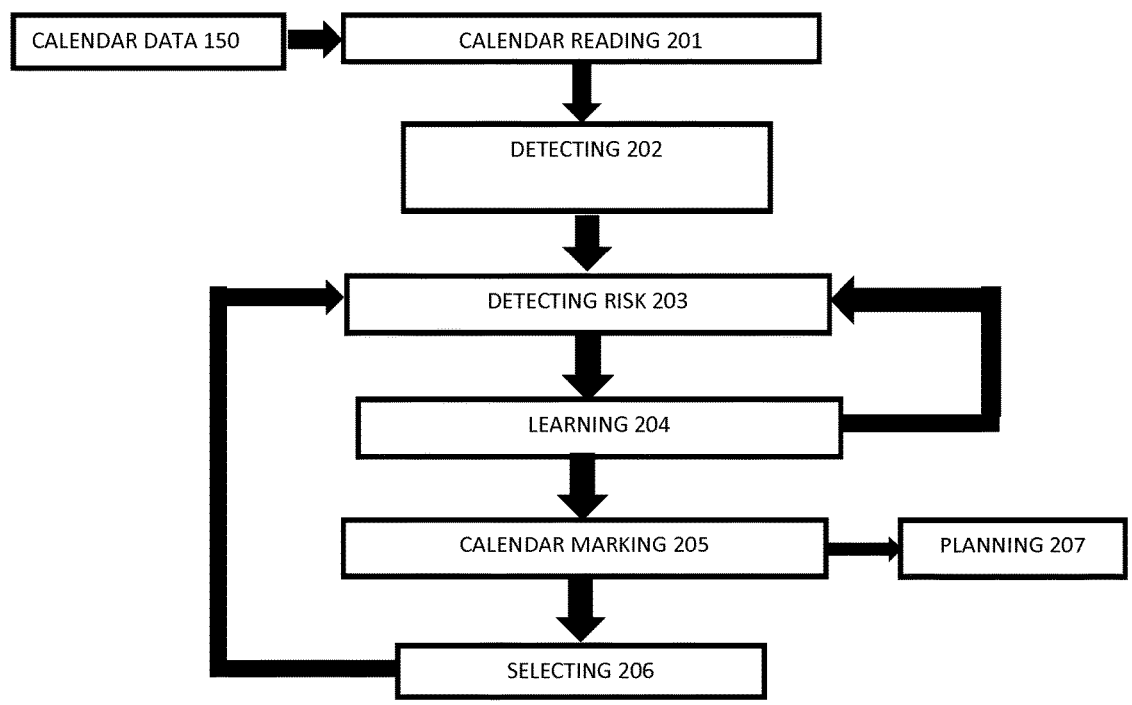
FIG. 2 exemplarily shows a high level flow chart for a fraud detection method.

FIG. 2 shows a high level flow chart for a method 200 for a fraud detection method.

Step 201 reads calendar data 150 of a user.

Step 202 detects attempted purchases made by a credit card belonging to the user.

Step 203 detects the risk of the purchase based on the calendar data 150 read in step 201.

Step 204 learns which purchases are fraudulent and which are not based on step 203 and updates step 203 to provide updated risk assessment based on the detected fraudulent purchases.

Step 205 marks the calendar with data of the purchases.

The user selects a purchase in Step 206 to identify that the purchase is fraudulent. Based on a user selection in Step 206 identifying a fraudulent purchase, Step 204 updates the risk detection in Step 203.

Step 207 plans for future purchases by providing insight into the rate of fraudulent transactions, amount spent on shopping, how expenditure per day/week is doing, etc. based on the calendar information.

In view of the foregoing and other problems, disadvantages, and drawbacks of the aforementioned background art, the disclosed invention above can provide a new and improved fraud detection system which can calculate psychological risk evaluation (i.e., emotional implication) and control the release of information to partially block potentially harmful information from a user.

An exemplary aspect of the disclosed invention provides a system, method, and non-transitory recording medium for fraud detection which can provide a technical solution to the technical problem in the conventional approaches in that the risk detection is based on a bi-directional feed between calendar data of the user and purchases by the user. Thus, conventional systems rely on a location of a purchase, while the disclosed invention can learn tendencies of the user purchases based on calendar data and provide a better fraud detection system than merely relying on a location of a purchase.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the fraud detection system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A fraud detection system comprising:
    a calendar reading device configured to read calendar data of a calendar for a user;
    a purchase detection device configured to detect an attempted purchase using a credit-card of the user; and
    a risk detection device configured to detect a likelihood of fraud by calculating a risk based on the calendar data and data related to the attempted purchase,
    wherein the risk detection device further determines a location of a user device at a time of the attempted purchase and updates the likelihood of fraud based on a distance of the user device from a location of the attempted purchase, and
    wherein the risk detection device further determines an intended location of the user from the calendar data and updates the likelihood of fraud based on the intended location of the user and the location of the attempted purchase,
    wherein a location of the purchase is graphically represented on the calendar.

2. The system of claim 1, further comprising a calendar marking device configured to mark the calendar with a mark of the attempted purchase detected by the purchase detection device.

3. The system of claim 2, wherein the mark includes data about the attempted purchase including a product or service purchased, a class of the product or the service purchased, a location of purchase, and data regarding a specific credit card used.

4. The system of claim 2, wherein the mark includes at least one of a graphical representation of the purchase and a textual description of the purchase.

5. The system of claim 1, further comprising a calendar marking device configured to mark the calendar with a first type of mark if the risk detection device detects the attempted purchase likely to be fraudulent and to mark the calendar with a second type of mark If the risk detection device detects the attempted purchase to be authorized.

6. The system of claim 1, further comprising a calendar marking device configured to mark the calendar with a first type of mark when the attempted purchase is attempted and a second type of mark when the attempted purchase is completed.

7. The system of claim 1, wherein the risk detection device includes a learning device configured to learn user purchase tendencies based on the calendar data and purchase data and configured to modify the risk calculated by the risk detection device.

8. The system of claim 1, wherein the risk detection device includes a learning device configured to modify the risk calculated by the risk detection device based on a fraudulent purchase.

9. The system of claim 1, wherein if the risk of the attempted purchase is greater than a threshold value, then the risk detection device labels the purchase as fraudulent.

10. The system of claim 1, wherein the user inputs data to change the calculation of the risk by the risk detection device.

11. The system of claim 2, further comprising a selecting device configured to select, by the user, the mark to label the purchase as fraudulent.

12. The system of claim 11, wherein the risk detection device includes a learning device configured to learn user purchase tendencies based on the calendar data, purchase data, and the fraudulent purchase labeled by the selecting device and configured to modify the risk calculated by the risk detection device.

13. The system of claim 1, wherein if the risk of the attempted purchase is greater than a threshold value, then the risk detection device labels the purchase as fraudulent, and
    wherein the risk detection device includes a learning device configured to learn fraudulent purchases and update the threshold value based on detected fraudulent purchases.

14. The system of claim 1, wherein the calendar reading device reads calendar data of a plurality of calendars for a plurality of users, and
    wherein the risk detection device calculates the risk based on the calendar data of the plurality of calendars and the attempted purchase.

15. The system of claim 14, wherein the risk detection device calculates the risk based on a proximity of a first user to a second user based on the calendar data of the first user and the second user.

16. The system of claim 14, wherein if an amount of the attempted purchase is greater than a threshold purchase amount is set by the users, then the risk detection device calculates the risk based on a distance of a first user to a second user such that if the distance is greater than a predetermined value, the risk detection device labels the purchase as fraudulent.

17. The system of claim 2, wherein the calendar marking device includes a planning device, configured to calculate at least one of a rate of fraudulent transactions, an amount spent on shopping, and expenditure per an amount of time based on the calendar data.

18. A non-transitory computer-readable recording medium recording a program for fraud detection, the program causing a computer to perform:
    reading calendar data of a calendar for a user;
    detecting an attempted purchase using a credit-card of the user;
    detecting a likelihood of fraud by calculating a risk based on the calendar data and the attempted purchase;
    determining a location of a user device at a time of the attempted purchase;
    updating the likelihood of fraud based on a distance of the user device from a location of the attempted purchase;
    determining an intended location of the user from the calendar data; and updating the likelihood of fraud based on the intended location of the user and the location of the attempted purchase, wherein a location of the purchase is graphically represented on the calendar.

19. A fraud detection method comprising:

reading, via a calendar reading device, calendar data of a calendar for a user;

detecting, via a purchase detection device, an attempted purchase using a credit-card of the user;

detecting, via a risk detection device, a likelihood of fraud by calculating a risk based on the calendar data and the attempted purchase;

determining, via the risk detection device, a location of a user device at a time of the attempted purchase;

updating, via the risk detection device, the likelihood of fraud based on a distance of the user device from a location of the attempted purchase;

determining, via the risk detection device, an intended location of the user from the calendar data; and updating, via the risk detection device, the likelihood of fraud based on the intended location of the user and the location of the attempted purchase, wherein a location of the purchase is graphically represented on the calendar.

20. The system of claim 1, sending an alert to the user when the likelihood of fraud is detected which displays the calendar and the graphically represented location on the calendar.

* * * * *